US012746708B2

(12) United States Patent
Vorsmann et al.

(10) Patent No.: US 12,746,708 B2
(45) Date of Patent: Sep. 29, 2026

(54) ELECTRICAL WORK APPARATUS

(71) Applicant: Andreas Stihl AG & Co. KG, Waiblingen (DE)

(72) Inventors: David Vorsmann, Balve (DE); Max Dopatka, Holzmaden (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 276 days.

(21) Appl. No.: 18/604,117

(22) Filed: Mar. 13, 2024

(65) Prior Publication Data

US 2024/0308108 A1 Sep. 19, 2024

(30) Foreign Application Priority Data

Mar. 14, 2023 (DE) ..................... 10 2023 106 399.5

(51) Int. Cl.

| | |
|---|---|
| ***B28D 7/02*** | (2006.01) |
| ***B25F 5/00*** | (2006.01) |
| ***H02K 5/20*** | (2006.01) |

(52) U.S. Cl.

CPC ................ *B28D 7/02* (2013.01); *B25F 5/008* (2013.01); *H02K 5/20* (2013.01)

(58) Field of Classification Search

CPC .............. B28D 7/02; B25F 5/008; H02K 5/20

USPC .......................................................... 173/197

See application file for complete search history.

(56) References Cited

U.S. PATENT DOCUMENTS

| | | | | |
|---|---|---|---|---|
| 5,099,160 | A * | 3/1992 | Strozel | B25F 5/008 310/47 |
| 9,537,370 | B2 | 1/2017 | Hess et al. | |
| 2007/0266966 | A1 | 11/2007 | Ohsawa et al. | |
| 2009/0218113 | A1* | 9/2009 | Johnen | B23Q 11/127 173/171 |
| 2018/0326337 | A1 | 11/2018 | Esenwein et al. | |
| 2020/0276694 | A1 | 9/2020 | Esenwein et al. | |
| 2020/0338780 | A1 | 10/2020 | Watanabe et al. | |
| 2022/0288762 | A1 | 9/2022 | Ito et al. | |
| 2022/0314422 | A1* | 10/2022 | Karlsson | B28D 1/045 |
| 2023/0090978 | A1* | 3/2023 | Arnell | B23Q 11/0064 408/67 |
| 2023/0099820 | A1 | 3/2023 | Kachi et al. | |

FOREIGN PATENT DOCUMENTS

| | | |
|---|---|---|
| DE | 963 637 C | 5/1957 |
| DE | 1 954 476 U | 2/1967 |
| DE | 38 24 234 A1 | 1/1990 |
| DE | 203 04 324 U1 | 7/2003 |

(Continued)

*Primary Examiner* — Nathaniel C Chukwurah

(74) *Attorney, Agent, or Firm* — Walter Ottesen, P.A.

(57) ABSTRACT

An electrical work apparatus includes a housing and a drive motor arranged in the housing. The drive motor is in the form of an electric motor and is provided for driving a tool of the work apparatus. A cooling air channel is formed in the housing for guiding a cooling air flow for cooling the drive motor. The cooling air channel has a curved channel section. A magnetic separator arrangement is arranged in the cooling air channel for filtering ferromagnetic particles from the cooling air flow. The magnetic separator arrangement is arranged in the curved channel section of the cooling air channel upstream of the drive motor with respect to the cooling air flow.

17 Claims, 8 Drawing Sheets

(56) References Cited

FOREIGN PATENT DOCUMENTS

| | | | |
|---|---|---|---|
| DE | 10 2007 024 213 | A1 | 1/2008 |
| DE | 10 2015 224 791 | A1 | 2/2017 |
| DE | 10 2015 225 748 | A1 | 6/2017 |
| DE | 10 2020 002 073 | A1 | 10/2020 |
| DE | 10 2022 000 651 | A1 | 9/2022 |
| DE | 10 2022 003 349 | A1 | 3/2023 |
| EP | 2 095 910 | A1 | 9/2009 |
| EP | 2 429 065 | A2 | 3/2012 |
| WO | 2021/254174 | A1 | 12/2021 |

* cited by examiner

ELECTRICAL WORK APPARATUS

CROSS-REFERENCE TO RELATED APPLICATIONS

This application claims priority of German patent application no. 10 2023 106 399.5, filed Mar. 14, 2023, the entire content of which is incorporated herein by reference.

BACKGROUND

Electrical work apparatuses which include a housing and a drive motor arranged in the housing are known. The drive motor is in the form of an electric motor. A tool of the work apparatus is driven via the drive motor. To cool the drive motor, such a work apparatus typically includes a cooling air channel. A cooling air flow flows along the cooling air channel and flows through the drive motor in order to cool same.

The cooling air flow often conveys undesirable dirt particles, including ferromagnetic particles, into the housing. Known work apparatuses provide magnetic separator arrangements which are intended to attract ferromagnetic particles adhering to the electric motor, in order to free the electric motor from the particles.

However, the use of magnetic separator arrangements in known work apparatuses rarely results in the complete removal of ferromagnetic particles from the electric motor.

SUMMARY

It is an object of the disclosure to specify an electrical work apparatus that provides efficient protection against contamination of the electric motor with ferromagnetic particles.

This object is, for example, achieved by an electrical work apparatus having:

- a housing and a drive motor arranged in the housing,
- the drive motor being in the form of an electric motor and being provided for driving a tool of the work apparatus,
- a cooling air channel formed in the housing for guiding a cooling air flow for cooling the drive motor,
- the cooling air channel having a curved channel section,
- a magnetic separator arrangement arranged in the cooling air channel for separating ferromagnetic particles from the cooling air flow.

Furthermore, the magnetic separator arrangement is arranged in the curved channel section of the cooling air channel upstream of the drive motor with respect to the cooling air flow.

The arrangement of the magnetic separator arrangement upstream of the drive motor enables the ferromagnetic particles to be separated from the cooling air flow before they can reach the drive motor. In the curved channel section, the ferromagnetic particles no longer follow the main air flow but rather, due to their comparatively high dead weight, are accelerated out of the main flow into the outer region of the channel section by the centrifugal forces that are in action. When the ferromagnetic particles escape from the main flow, they are decelerated and then attracted by the magnetic separator arrangement and fixed thereon. Via the arrangement of the magnetic separator arrangement in the curved channel section, highly effective cleaning of the cooling air flow from the ferromagnetic particles is possible.

In other words, the term "upstream" should be understood as meaning "counter to the flow direction". In other words, the term "downstream" should be understood as meaning "in the flow direction".

It is advantageously provided that the cooling air flow in the curved channel section has a main flow, and the main flow runs substantially perpendicularly to a first flow plane and perpendicularly to a second flow plane, wherein the first flow plane and the second flow plane enclose an angle, wherein the angle is at least 10°, in particular at least 30°, particularly preferably at least 60°, in particular at least 80°. As the angle between the first flow plane and the second flow plane increases, the radius of the curve through which the main flow flows along the curved channel section also becomes at least indirectly smaller. As the angle increases, the centrifugal force thus also increases, as a result of which the ferromagnetic particles can be separated even more efficiently from the cooling air flow.

It is particularly advantageously provided that the magnetic separator arrangement extends between the two flow planes over an angle ß which is at least 10°, in particular at least 30°, particularly preferably at least 50°. The larger the region of the curved channel section covered by the magnetic separator arrangement, the more efficiently are the ferromagnetic particles absorbed by the magnetic separator arrangement.

It is particularly advantageously provided that the magnetic separator arrangement overlaps with the main flow in the direction of the main flow in the first flow plane. Thus, the main flow at the beginning of the curved channel section preferably flows in the direction of the magnetic separator arrangement. As soon as the main flow of the cooling air flow flows along the curve in the curved channel section, the ferromagnetic particles are thrown directly onto the magnetic separator arrangement by the centrifugal force. Advantageously, the magnetic separator arrangement overlaps with the main flow counter to the direction of the main flow in the second flow plane. Accordingly, the main flow flows away from the magnetic separator arrangement after the ferromagnetic particles have been thrown onto the magnetic separator arrangement by the centrifugal force.

It is preferably provided that the curved channel section in its channel interior space in the region of the curve has an inner side and an outer side, wherein the distance between the magnetic separator arrangement and the outer side is smaller than the distance between the magnetic separator arrangement and the inner side. Via the arrangement of the magnetic separator arrangement in the vicinity of the outer side of the curved channel section, the air flow can flow between the channel inner side of the curved channel section and the magnetic separator arrangement, with the ferromagnetic parts being thrown directly onto the magnetic separator arrangement. Particularly preferably, the magnetic separator arrangement extends along a longitudinal axis and, with respect to its longitudinal axis, is arranged approximately tangentially to the main flow. Thus, the main flow is not blocked by the magnetic separator arrangement and accordingly the magnetic separator arrangement does not form a substantial resistance for the main flow.

It is advantageously provided that the magnetic separator arrangement is held releasably on the housing. Thus, the magnetic separator arrangement can be removed from the housing of the work apparatus, easily cleaned and then reattached to the housing. Furthermore, the curved channel section in the region of the magnetic separator arrangement can also be cleaned. It is therefore also possible to simply replace defective parts of the magnetic separator arrangement.

Particularly preferably, the magnetic separator arrangement includes a carrier and at least one permanent magnet held in/on the carrier. Advantageously, the magnetic separator arrangement includes a plurality of permanent magnets, in particular at least three permanent magnets. The permanent magnets are preferably arranged one behind another in the direction of the longitudinal axis of the magnetic separator arrangement. Other arrangements of the permanent magnets may also be expedient. At this point, it should be noted that the size and number of the permanent magnets are to be configured primarily depending on the size of the cooling air channel and the size of the volumetric flow rate of the cooling air.

It is particularly advantageously provided that the curved channel section has a first longitudinal side and a second longitudinal side opposite the first longitudinal side, wherein the magnetic separator arrangement is arranged in the curved channel section in such a way that the flow can pass around the magnetic separator arrangement in the region of the at least one permanent magnet both on a first side of the magnetic separator arrangement facing the first longitudinal side of the channel section and on a second side of the magnetic separator arrangement facing the second longitudinal side of the channel section. Accordingly, the side surfaces of the magnetic separator arrangement are spaced apart from the first longitudinal side and from the second longitudinal side of the curved channel section. This results in an even lower flow resistance of the cooling air flow. In addition, the ferromagnetic particles can be collected on the magnetic separator arrangement in this region.

Particularly preferably, the housing includes a ventilation grid with at least one inlet opening for the cooling air flow, wherein the inlet opening is part of the cooling air channel and leads into the curved channel section. The inlet opening forms a drainage opening of the cooling air channel. The drainage opening is configured in such a way that all of the liquid in the region of the inlet opening can flow into the environment via the ventilation grid.

Preferably, a reservoir for collecting dirt particles, in particular mineral dirt particles, is provided in the region of the inlet opening in the cooling air channel.

BRIEF DESCRIPTION OF DRAWINGS

The invention will now be described with reference to the drawings wherein.

DETAILED DESCRIPTION

Figure 1:
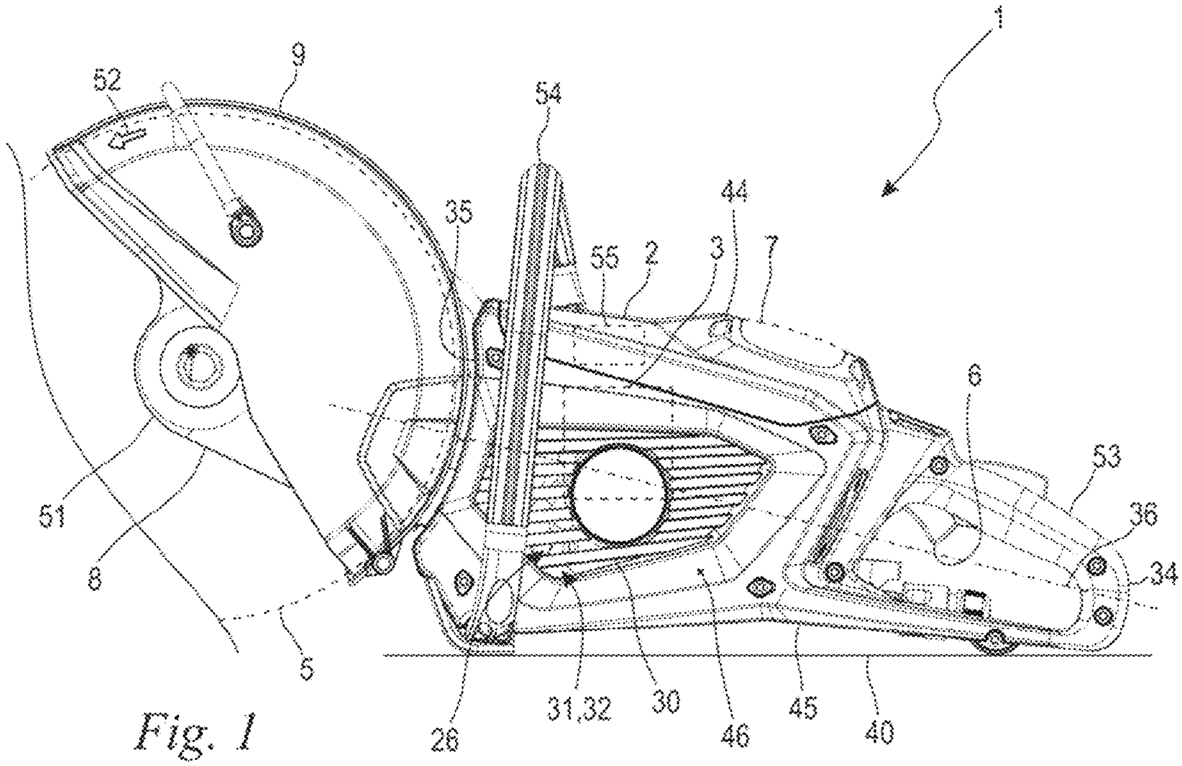
FIG. 1 shows, in a side view, an embodiment according to the disclosure of the electrical work apparatus.

FIG. 1 shows a cut-off machine as an embodiment of an electrical work apparatus 1 according to the disclosure. An alternative configuration of the work apparatus 1, for example as a chain saw, is also possible. The work apparatus 1 is a handheld, portable work apparatus 1. The work apparatus 1 is carried and guided by the operator during operation. The work apparatus 1 has a housing 2 on which a handle 53 and a bale handle 54 are arranged for guiding the work apparatus 1 during operation. Other handles may also be provided. A drive motor 3 is arranged in the housing 2. The drive motor 3 is merely illustrated schematically by a dashed rectangle. An operator controlled element 6 for activating the drive motor 3 is provided on the rear handle 53. In the embodiment, the drive motor 3 is an electric motor. The electric motor is supplied with power by a battery 7 held in the housing 2. The work apparatus 1 includes an outrigger 8 which is fixed at one end thereof to the housing 2. The outrigger 8 has a free end 51 that protrudes away from the housing 2. A tool 5 is mounted rotatably at the free end 51 of the outrigger 8. The tool 5 is merely indicated schematically. In the embodiment, the tool 5 is a cutting disk. During operation of the work apparatus 1, the tool 5 is rotationally driven by the drive motor 3 in a rotational direction 52. A protective hood 9 is fixed on the outrigger 8. The protective hood 9 covers the tool 5 over a part of its circumference.

Figure 2:
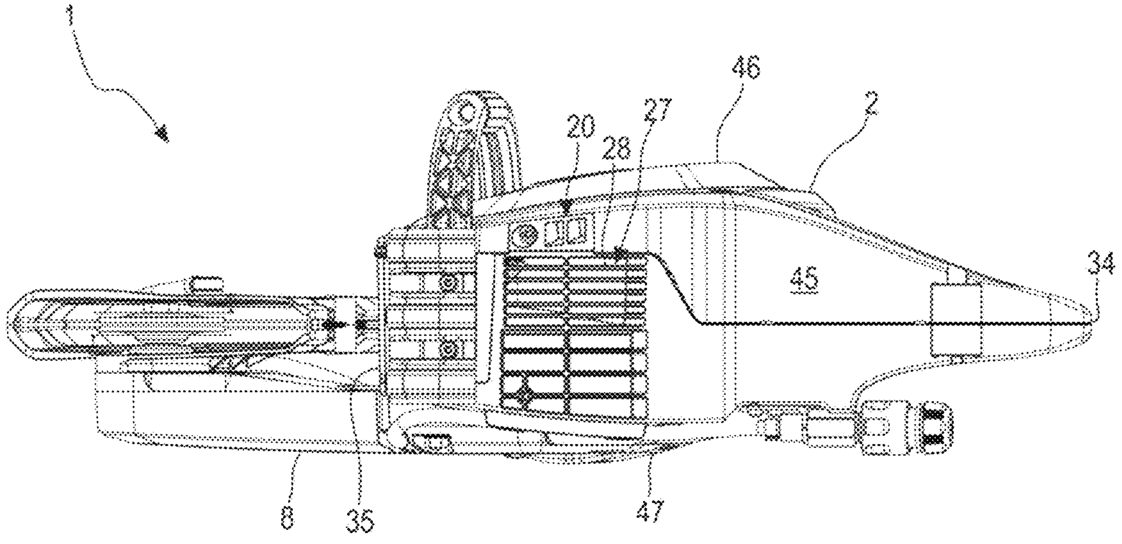
FIG. 2 shows, in a view from below, the work apparatus according to FIG. 1.

As shown in FIGS. 1 and 2, the housing 2 extends along a longitudinal center axis 36 from a rear end 34 to a front end 35. The rear end 34 of the housing 2 is formed on the handle 53. The outrigger 8 extends beyond the front end 35 of the housing 2, with the tool 5 arranged on the outrigger 8. Furthermore, the housing 2 includes a top side 44 and a bottom side 45, the work apparatus 1 being able to be set down on the bottom side 45 onto the ground 40. The top side 44 and the bottom side 45 are connected to each other by a first longitudinal side 46 and a second longitudinal side 47.

In the preferred embodiment, the work apparatus 1 includes a control unit 55 arranged in the housing 2. The control unit 55 is illustrated schematically in FIG. 1 by a dashed rectangle. The control unit 55 processes signals generated by operator control elements 6 and is essentially used to control the drive motor 3.

Figure 4:
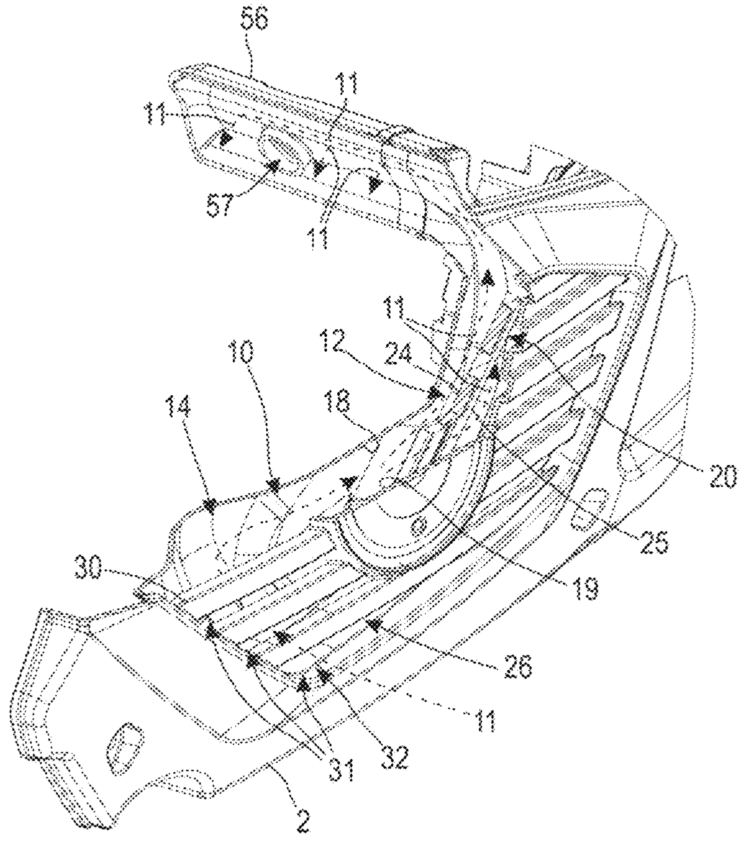
FIG. 4 shows, in a partial, perspective sectional illustration according to the intersecting line between the arrows IV in FIG. 3, the work apparatus according to FIG. 1.

The work apparatus 1 includes at least one cooling air channel 10 for guiding a cooling air flow 11 (FIG. 4). Via the cooling air flow 11, the drive motor 3, which is in the form of an electric motor, is cooled during operation of the work apparatus 1. In addition, further components, in particular electronic components, of the work apparatus 1 are intended to be cooled. Such electronic components include, for example, the control unit 55.

As shown in FIGS. 1 and 2, a channel inlet 26 and a channel outlet 27 are provided in the housing 2. The cooling air flow 11 flows into the cooling air channel 10 via the channel inlet 26. The cooling air flow 11 then flows through the cooling air channel 10 and, in the process, cools the control unit 55 and the drive motor 3. Finally, the cooling air flow 11 flows out of the cooling air channel 10 via the channel outlet 27 into the environment. In the embodiment, the channel inlet 26 is arranged on the first longitudinal side 46 of the housing 2. The channel inlet 26 is formed by a first ventilation grid 30 of the housing 2. As shown in FIG. 2, in the preferred embodiment, the channel outlet 27 is formed on the bottom side 45 of the housing 2. The channel outlet 27 is formed by a second ventilation grid 28 of the housing 2.

Figure 3:
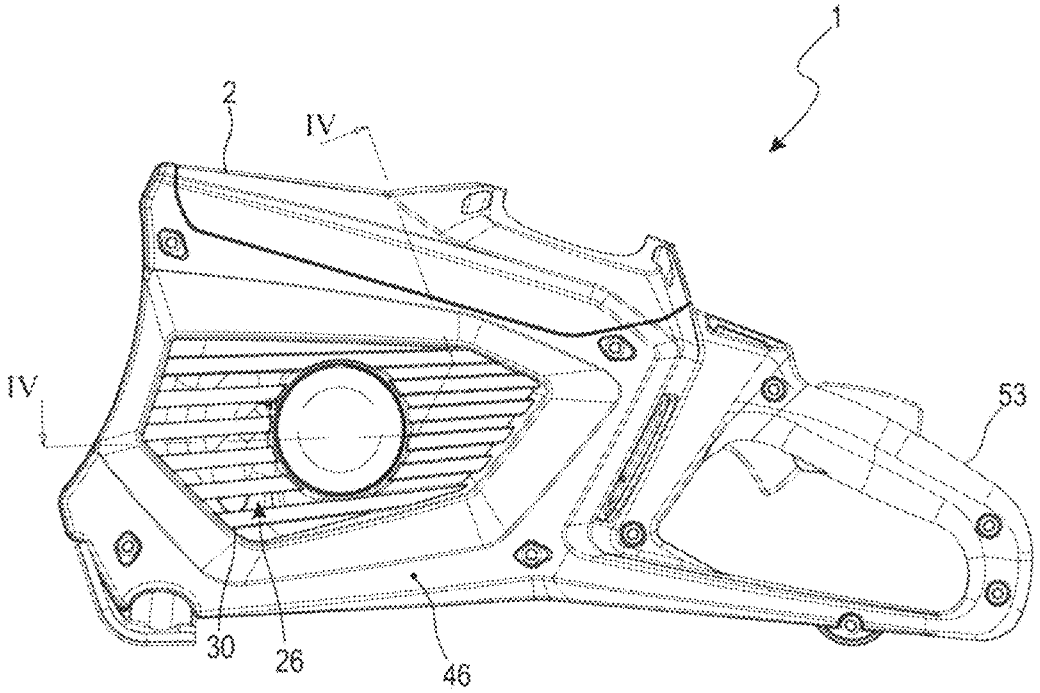
FIG. 3 shows, in a side view, the work apparatus according to FIG. 1 without an outrigger.
Figure 5:
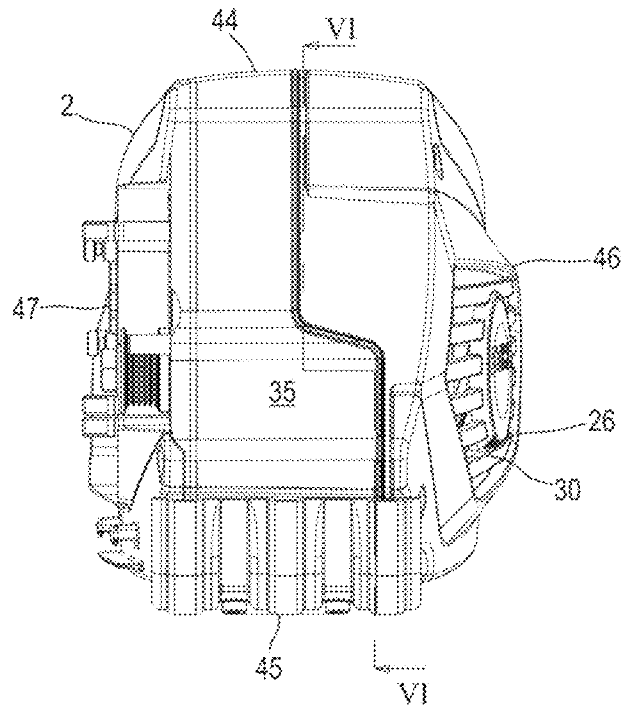
FIG. 5 shows, in a view from the front, the work apparatus according to FIG. 1 without an outrigger.
Figure 6:
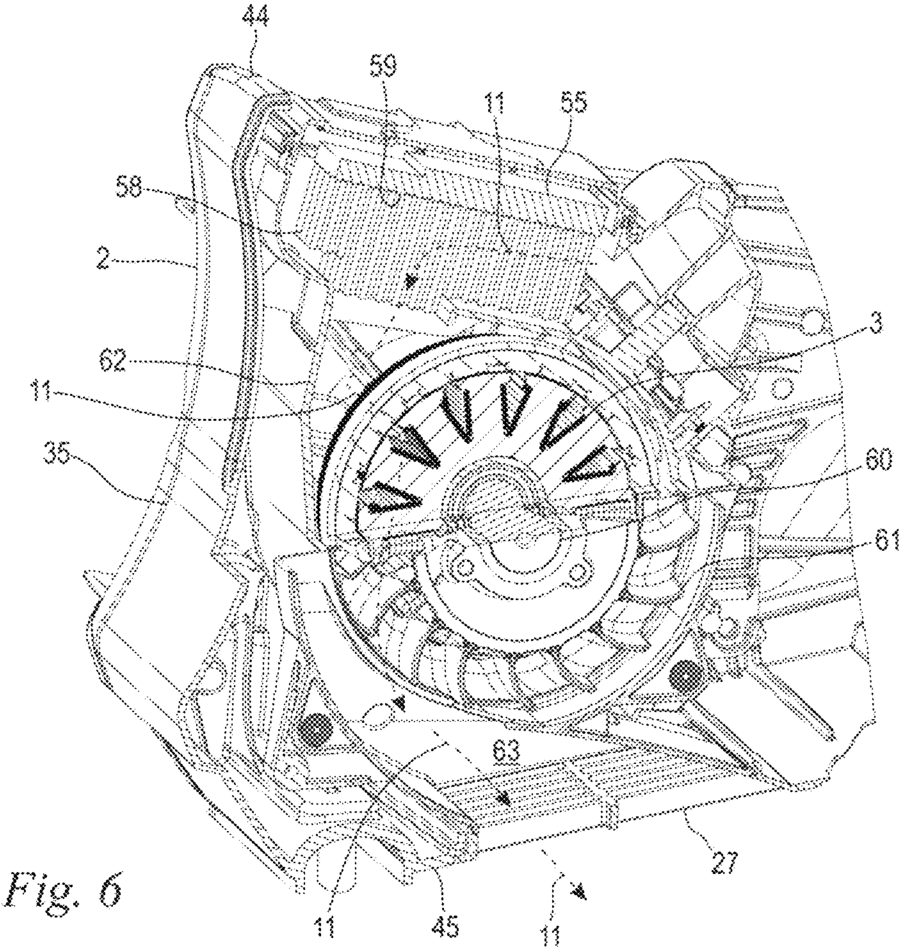
FIG. 6 shows, in a partial, perspective sectional illustration according to the intersecting line between the arrows VI in FIG. 5, the work apparatus according to FIG. 1.

FIGS. 4 to 6 show the course of the cooling air flow 11 in more detail. FIG. 3 shows, in a side view, part of the work apparatus 1 according to the disclosure. FIG. 4 shows a perspective sectional image according to the intersecting line between the arrows IV in FIG. 3. FIG. 4 illustrates the first longitudinal side 46 of the housing 2. On the first longitudinal side 46, the channel inlet 26 is formed by the first ventilation grid 30. The cooling air flow 11 flows from the outside environment via the channel inlet 26 into the cooling air channel 10. From there, the cooling air flow 11 flows in the direction of the rear end 34 of the housing 2 into a curved channel section 12. The curved channel section 12 guides the cooling air flow 11 in the direction of the top side 44 of the housing 2. The cooling air channel 10 then runs along a cross section 56 in the direction of the second longitudinal side 47. The cross section 56 is part of the housing 2. An opening 57 for a screw dome is provided in the cross section 56.

FIG. 5 shows the front view of the housing 2 of the work apparatus 1. FIG. 6 shows a partial, perspective sectional illustration of the work apparatus 1 along the intersecting line between the arrows VI in FIG. 5. The control unit 55 is attached to the housing 2. A heat sink 58 is arranged on the control unit 55, in particular on a bottom side 59 of the control unit 55. The heat sink 58 is formed from a plurality of individual small rods which are spaced apart from one another. The cooling air flow 11 flows around the control unit 55. Furthermore, the cooling air flow flows through the heat sink 58, as a result of which the heat is dissipated from the control unit 55. In addition, the cooling air flow 11 flows around other electronics, not shown in detail, of the work apparatus, for example the phase connections of the electric motor, et cetera. The cooling air channel 10 continues into a spiral housing 62. Accordingly, the cooling air flow 11 flows from the control unit 55 into the spiral housing 62.

As shown in FIG. 6, the drive motor 3, in particular electric motor, is arranged in the spiral housing 62. The drive motor 3 has a drive shaft 60. A fan wheel 61, which is rotationally driven by the drive motor 3, is mounted on the drive shaft 60. During the operation of the work apparatus 1, the fan wheel 61 generates a vacuum in the spiral housing 62, as a result of which the cooling air flow 11 is generated. The cooling air flow 11 flows in the spiral housing 62 around the drive motor 3 as far as the fan wheel 61. The fan wheel 61 directs the cooling air flow 11 via a diffuser 63 through the channel outlet 27 into the outside environment.

Figure 10:
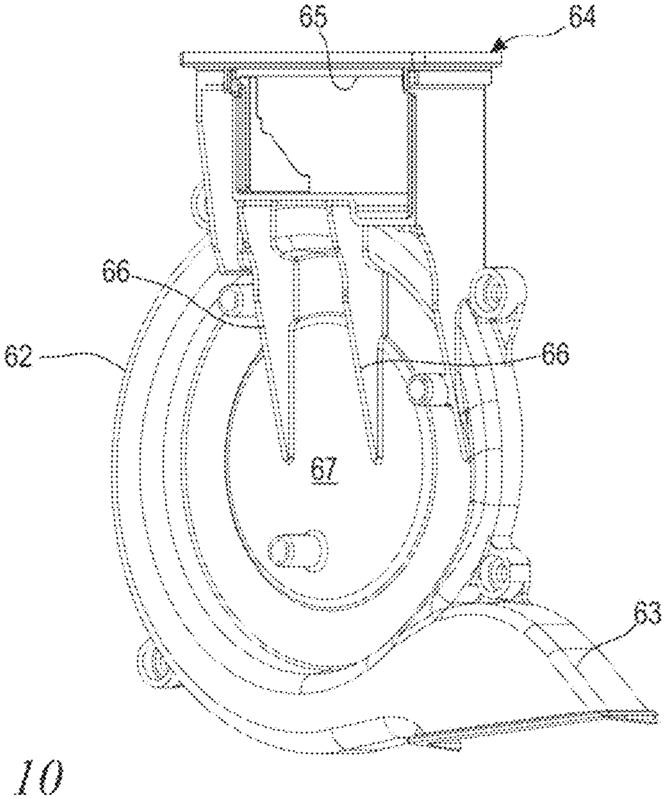
FIG. 10 shows, in a perspective illustration, the spiral housing of the work apparatus according to FIG. 1.

FIG. 10 shows a perspective view of the spiral housing 62. A special feature of the spiral housing 62 is that the spiral housing 62 includes a support arrangement 64 for receiving the control unit 55. Other electronic components of the work apparatus 1 can also be attached to or supported on the support arrangement 64. The support arrangement 64 is formed from a rectangular frame. The control device 55 and the heat sink 58 are incorporated in the frame (FIG. 6). To provide sufficient rigidity for the support arrangement 64, a plurality of reinforcing ribs 66, which preferably protrude into the center of the spiral 67, are integrally formed on the support arrangement. The spiral housing 62 is formed in one piece. The spiral housing 62 is preferably an injection molded part. By integration of the support arrangement 64 in the spiral housing 62, the number of components and costs associated therewith can be reduced. In addition, the assembly of the work apparatus 1 is simplified.

Figure 7:
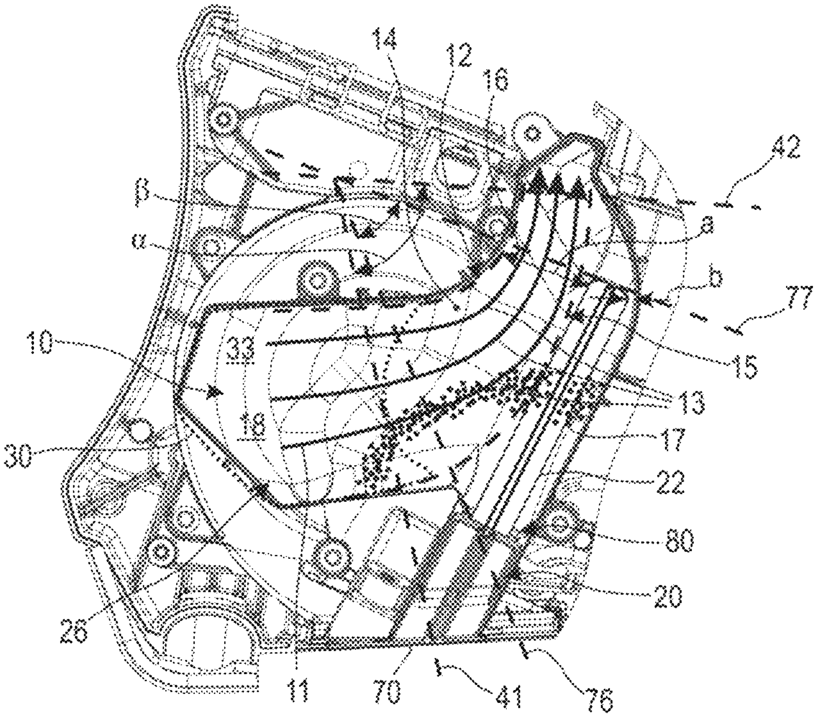
FIG. 7 shows, in a partial side illustration, the cooling air channel in the region of the curved channel section with a magnetic separator arrangement of the work apparatus according to FIG. 1.

FIG. 7 shows a detail of the cooling air channel 10. The first ventilation grid 30 is shown by dotted lines. Accordingly, the cooling air flow 11 flows through the channel inlet 26 in the viewing direction of FIG. 7. Immediately after flowing in through the first ventilation grid 30, the cooling air flow 11 changes its direction toward the rear end 34 of the housing 2. Via the change in the flow direction of the cooling air flow 11, dirt particles, in particular also mineral dirt particles, are thrown against a first longitudinal side 18 of the cooling air channel 10. In order to keep the channel inlet 26 free from dirt, a reservoir 33 for receiving dirt particles is formed on the longitudinal side 18 of the cooling air channel 10 in the region of the channel inlet 26. The reservoir 33 extends in the direction from the first longitudinal side 46 to the second longitudinal side 47. In other words, the reservoir 33 constitutes an indentation in the longitudinal side 18.

As shown in FIG. 7, a magnetic separator arrangement 20 is arranged in the curved channel section 12 of the cooling air channel 10. The magnetic separator arrangement 20 is thus arranged upstream of the drive motor 3. The magnetic separator arrangement 20 is used to separate ferromagnetic particles from the cooling air flow 11.

Figure 9:
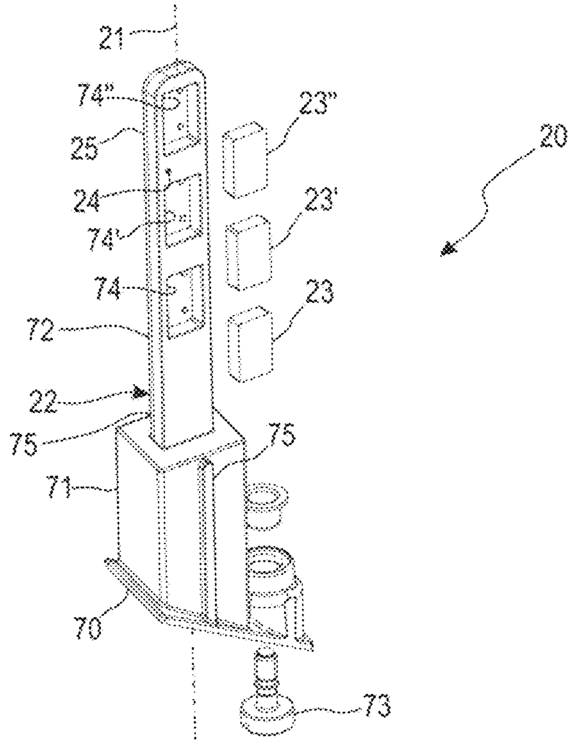
FIG. 9 shows, in a perspective exploded illustration, the magnetic separator arrangement of the work apparatus according to FIG. 1.

As shown in FIG. 9, the magnetic separator arrangement 20 includes at least one permanent magnet 23, 23', 23". In the preferred embodiment, the magnetic separator arrangement 20 includes a plurality of permanent magnets 23, 23', 23", in particular three permanent magnets 23, 23', 23". It may be expedient to provide a different number and a different size of the permanent magnets 23, 23', 23", in particular in an embodiment according to the disclosure of the work apparatus 1 which has a cooling air flow 11 with a significantly different volume flow rate. The magnetic separator arrangement 20 includes a carrier 22. The at least one permanent magnet 23, 23', 23", in particular the plurality of permanent magnets 23, 23', 23", preferably the three permanent magnets 23, 23', 23", is or are held on the carrier 22. The carrier 22 has a base 70. A pedestal 71 is formed at the base 70 of the carrier 22. The pedestal 71 serves to bear against the housing 2 of the work apparatus 1. A sword-shaped extension 72 is arranged at the end of the pedestal 71 facing away from the base 70. The permanent magnets 23, 23', 23" are held on the extension 72. The magnetic separator arrangement 20 has a longitudinal center axis 21. The base 70, the pedestal 71 and the extension 72 are arranged one behind another along the longitudinal center axis 21. The cross section of the extension 72 is smaller than the cross section of the pedestal 71. The permanent magnets 23, 23', 23" are arranged one behind another in the direction of the longitudinal center axis 21 of the magnetic separator arrangement 20.

As shown in FIG. 9, the extension 72 has openings 74, 74', 74". A permanent magnet 23, 23', 23" is held in each opening 74, 74', 74". The openings 74, 74', 74" are not configured as through openings in the present embodiment. Accordingly, the openings 74, 74', 74" are formed on the first side 24 of the extension 72. The second side 25 of the extension 72 is closed. In the preferred embodiment, the permanent magnets 23, 23', 23" are adhesively bonded on the carrier 22, in particular are held in the openings 74, 74', 74" of the extension 72. The permanent magnets 23, 23', 23" are adhesively bonded on one pole side. In an alternative embodiment, it may also be provided that the permanent magnets 23, 23', 23" are pressed in. Advantageously, the permanent magnets 23, 23', 23" may be adhesively bonded and pressed in. Other types of fastening of the permanent magnets 23, 23', 23" to the carrier 22 are also possible. An accumulation of ferromagnetic particles is possible in the region of both pole sides of the permanent magnets 23, 23', 23". In an alternative embodiment, likewise according to the disclosure, the openings 74, 74', 74" can be configured as through openings, and therefore both pole sides of the permanent magnets 23, 23', 23" are in direct contact with the cooling air flow 11.

Figure 8:
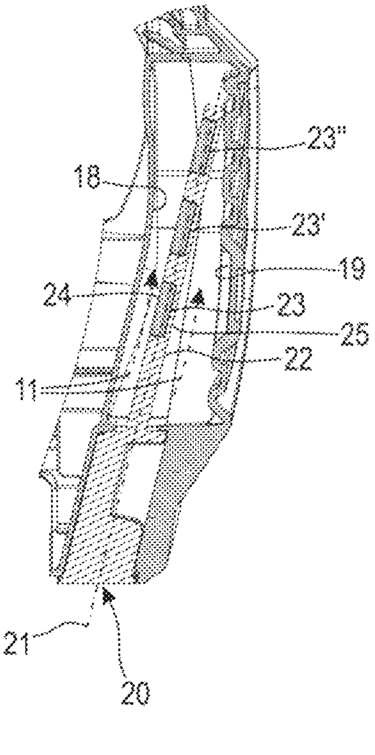
FIG. 8 shows, in a partial sectional illustration, the magnetic separator arrangement of the work apparatus according to FIG. 1.

As shown in FIG. 9, the magnetic separator arrangement 20 is held releasably on the housing 2. The magnetic separator arrangement 20 has a fastener 73, via which the magnetic separator arrangement 20 is attached to the housing 2. In the preferred embodiment, the fastener 73 is in the form of a screw. As also shown in FIGS. 7 and 8, the magnetic separator arrangement 20 is inserted with its extension 72 in front into the housing 2. The magnetic separator arrangement 20 is supported on the housing 2 via the pedestal 71. Furthermore, the pedestal 71 has two guide bars 75, which are formed on opposite sides of the pedestal 71. The guide bars 75 engage in mating contours formed on the housing 2. Thus, the assembly of the magnetic separator arrangement 20 is simplified. The extension 72 of the carrier 22 protrudes with the permanent magnets 23, 23', 23" attached to the extension 72 into the curved channel section 12. The base 70 of the magnetic separator arrangement 20 ends flush with the outer side of the housing 2.

As in FIG. 7, the curved channel section 12 in its channel interior 14 in the region of its curve 15 has an inner side 16 and an outer side 17. The radius of the outer side 17 is greater than the radius of the inner side 16. The first longitudinal side 18 of the curved channel section 12 and a second longitudinal side 19 of the curved channel section 12 opposite the first longitudinal side 18 are connected to each other by the inner side 16 and the outer side 17. The magnetic separator arrangement 20 is arranged adjacent to the outer side 17 of the curved channel section 12. Accordingly, a distance b between the magnetic separator arrangement 20 and the outer wall 17 of the curved channel section 12 is less than a distance a between the magnetic separator arrangement 20 and the inner wall 16 of the curved channel section 12. The distance b between the magnetic separator arrangement 20 and the outer wall 17 is not more than 50%, preferably not more than 30%, preferably not more than 15% of the distance a between the magnetic separator arrangement 20 and the inner wall 16. A mean length of the curved channel section 12 is preferably 100 to 140 mm.

As shown in FIG. 7, the cooling air flow 11 in the curved channel section 12 of the cooling air channel 10 has a main flow 13. The main flow 13 runs along the curved channel section 12. Centrifugal forces act on particles, in particular ferromagnetic particles, which are located in the main flow 13. Via the centrifugal forces acting on the particles, the latter are carried outward, that is, to the outer side 17 of the curved section 12. As the curve increases, the centrifugal forces acting on the particles also increase.

As shown in FIG. 7, the main flow 13 has a first flow plane 41 and a second flow plane 42. The main flow 13 is formed substantially perpendicularly to the flow planes 41, 42. The flow planes 41, 42 intersect the main flow 13 at different flow sections of the main flow 13. The first flow plane 41 and the second flow plane 42 enclose an angle α. The angle α is open toward the magnetic separator arrangement 20, in particular toward at least one permanent magnet 23, 23', 23". The angle α is preferably at least 10°, in particular at least 30°, particularly preferably at least 60°, in particular at least 80°.

As shown in FIG. 7, the magnetic separator arrangement 20 is arranged in the curved channel section 12 in such a way that the ferromagnetic particles, which are carried by the centrifugal force out of the main flow 13 in the direction of the outer side 17 of the curved channel section 12, are collected by the permanent magnets 23, 23', 23". The ferromagnetic particles are illustrated schematically by the cloud of dots shown in FIG. 7. So that as many ferromagnetic particles as possible can be detected, it is advantageous if the magnetic separator arrangement 20 extends over as large a section as possible along the curved channel section 12, in particular along the section with the largest curve. For this purpose, it is provided that the magnetic separator arrangement 20 extends between the two flow planes 41, 42 over an angle ß which is at least 10°, preferably at least 30°, particularly preferably at least 50°. The angle ß results from a first tangential plane 76 and a second tangential plane 77, which intersect in the same straight line as the flow planes 41, 42. The first tangential plane 76 is tangent to the extension 72 of the magnetic separator arrangement 20 at the end facing the pedestal 71. The second tangential plane 77 is tangent to the extension 72 of the magnetic separator arrangement 20 at the free end.

As shown in FIG. 7, the main flow 13 of the cooling air flow 11 first runs toward the magnetic separator arrangement 20. Shortly before reaching the magnetic separator arrangement 20, the main flow 13 runs along a curve and flows away from the magnetic separator arrangement 20. So that the ferromagnetic particles are also thrown in the direction of the magnetic separator arrangement 20, it is advantageous if the initial flow direction of the main flow, that is, the flow direction of the main flow in the first flow plane 41, is directed to the magnetic separator arrangement 20. Thus, the magnetic separator arrangement 20 overlaps with the direction of the main flow 13 at the first flow plane 41. Accordingly, an imaginary extension axis of the main flow 13 at the first flow plane 41 intersects the magnetic separator arrangement 20. If the main flow 13 has passed the magnetic separator arrangement 20, the main flow 13 runs in a direction away from the magnetic separator arrangement 20. Accordingly, the magnetic separator arrangement 20 preferably overlaps with the main flow 13 counter to the direction of the main flow 13 in the second flow plane 42. An imaginary extension axis at the main flow 13 in the second flow plane 42 also intersects the magnetic separator arrangement 20. The first flow plane 41 lies upstream of the second flow plane 42.

As shown in FIG. 7, the magnetic separator arrangement 20 is arranged in the curved channel section 12 in such a way that the longitudinal center axis 21 of the magnetic separator arrangement 20 is aligned approximately tangentially to the main flow 13.

As shown in FIG. 8, the magnetic separator arrangement 20 is arranged in the curved channel section 12 in such a way that the flow can flow around the magnetic separator arrangement 20 on its longitudinal sides 24, 25 in the region of the permanent magnets 23, 23', 23". Accordingly, the permanent magnets 23, 23', 23" are spaced apart from the longitudinal sides 18, 19 of the curved channel section 12. The magnetic separator arrangement 20 is arranged in the curved channel section in such a way that the first longitudinal side 24 of the magnetic separator arrangement 20 faces the first longitudinal side 18 of the curved channel section 12. Furthermore, the second longitudinal side 25 of the magnetic separator arrangement 20 faces the second longitudinal side 19 of the curved channel section 12.

As shown in particular in FIG. 7, a collection area 80 for receiving particles, in particular ferromagnetic particles, is provided in the curved channel section 12 in the region of the magnetic separator arrangement 20. The collection area 80 is arranged below the main flow 13. The collection area 80 adjoins the pedestal 71 of the magnetic separator arrangement 20. If, for example, the magnetic separator arrangement 20 is dismantled for cleaning, all of the particles located in the collection area 80 fall out of the cooling air channel 10 into the environment.

As shown in particular in FIG. 4, the ventilation grid 30 has at least one inlet opening 31. The inlet openings 31 together form the channel inlet 26, via which the cooling air flow 11 flows into the channel interior space 14. The inlet openings 31 are the openings provided between the individual ribs of the ventilation grid 30. If work apparatuses are used in damp environments, spray water may enter the cooling air channel 10 via the ventilation grid 30. This can also be the case, for example, when the work apparatus 1 is sprayed with water for cleaning purposes. In the preferred embodiment of the work apparatus 1, provision is now made for a drainage opening 32 to be provided on the ventilation grid 30. The drainage opening 32 is configured in such a way that water which has entered the cooling air channel 10 can drain out of the drainage opening 32 into the environment. The drainage opening 32 is formed by the lowermost inlet opening 31 of the ventilation grid 30. The drainage opening 32 is configured in such a way that, when the work apparatus 1 (FIG. 1) is set down on horizontal ground 40, liquid contained in the cooling air channel 10 can drain completely in the region of the channel inlet 26. For this purpose, the drainage opening 32 is arranged at least as deep as the base of the channel interior space 14 in the region of the channel inlet 26. Preferably, the drainage opening 32 has a draining slope oriented toward the environment, so that liquids can drain even better out of the channel interior space 14 into the environment.

Figure 11:
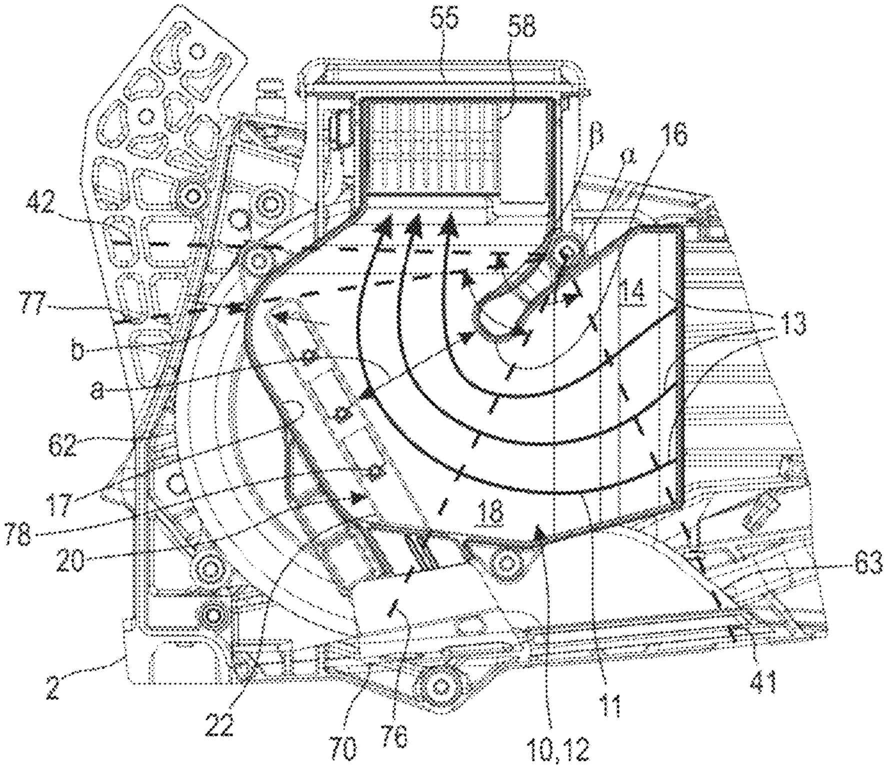
FIG. 11 shows, in a partial side illustration, the cooling air channel in the region of the curved channel section with a magnetic separator arrangement of a further embodiment likewise according to the disclosure of a work apparatus.
Figure 12:
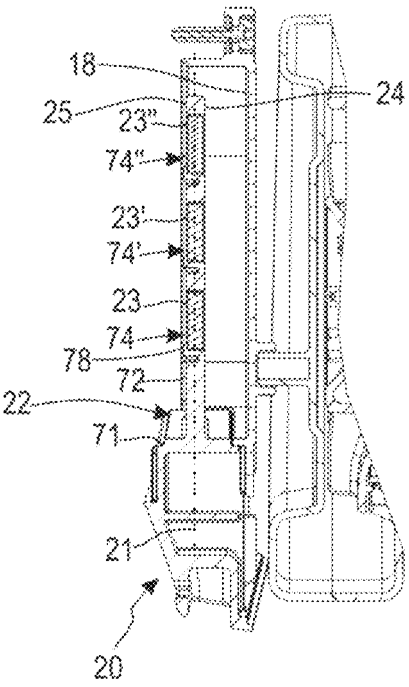
FIG. 12 shows, in a partial sectional illustration, a magnetic separator arrangement for a work apparatus according to FIG. 11.

FIGS. 11 and 12 show the curved channel section 12 with a magnetic separator arrangement 20 of a further embodiment according to the disclosure of the work apparatus. The same reference signs refer to the same components. Only the differences of the embodiment of the work apparatus according to FIGS. 11 and 12 compared to the embodiment according to FIGS. 1 to 10 will be described below.

As shown in FIG. 11, the angle $\alpha$ between the two flow planes 41, 42 is significantly larger, in particular more than 90°. The magnetic separator arrangement 20 is likewise located upstream of the electric motor. However, the cooling air flow 11 leads directly after the curved channel section 12 to the heat sink 58 at the control unit 55. As shown in FIG. 12, the openings 74, 74', 74" of the magnetic separator arrangement 20 are in the form of through openings. Latching connections 78 are provided as the fastening for the permanent magnets 23, 23', 23". The permanent magnets 23, 23', 23" are simply pressed into the openings 74, 74', 74" until they latch into place.

FIGS. 13 to 17 show an alternative magnetic separator arrangement 20. The same reference signs denote the same components or the same structural elements. In particular, the differences with respect to the magnetic separator arrangement according to FIG. 9 are to be described below.

Figure 13:
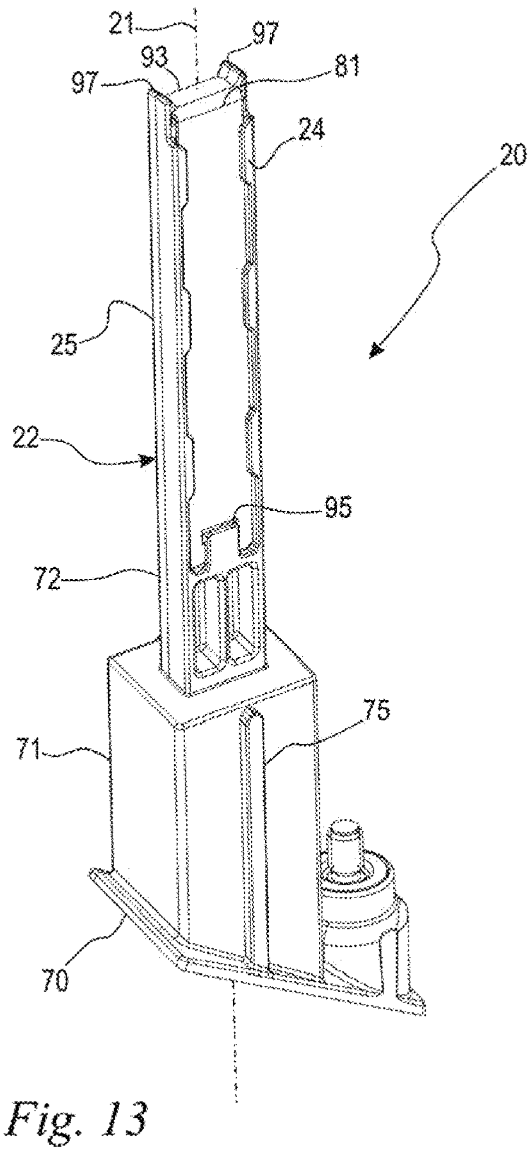
FIG. 13 shows, in a perspective illustration, an alternative embodiment of the magnetic separator arrangement.

As shown in FIG. 13, the magnetic separator arrangement 20 includes a fixation element 81 for fixing the permanent magnets 23, 23', 23" in the carrier 22. In the embodiment according to FIG. 13, an opening 74, 74', 74" for receiving the permanent magnets 23, 23', 23" is also formed for each permanent magnet 23, 23', 23" in the carrier 22. The opening 74, 74', 74" is in the form here of a through opening. In an alternative embodiment, the opening 74, 74', 74" may also be closed on one side. In each opening 74, 74', 74", the carrier 22 has a supporting surface 82, on which the permanent magnet 23, 23', 23" inserted into the opening 74, 74', 74" comes to bear. In the present embodiment, the supporting surface 82 is formed on the second longitudinal side 25 of the magnetic separator arrangement 20. The permanent magnet 23, 23', 23" thus rests with its bottom side 84 on the supporting surface 82 of the second longitudinal side 25 of the magnetic separator arrangement 20. The fixation element 81 is provided in order for the permanent magnet 23, 23', 23" to be held in the carrier 22. It is thus intended to be avoided that the permanent magnet 23, 23', 23" will fall out on the first longitudinal side 24 of the magnetic separator arrangement 20. The fixation element 81 contacts the permanent magnet 23, 23', 23" on its top side 85 opposite the bottom side 84 and thereby fixes the permanent magnet in the opening 74, 74', 74" of the magnetic separator arrangement 20. It is therefore not possible for the permanent magnet 23, 23', 23" to fall out of the opening 74, 74', 74" on the first longitudinal side 24 of the magnetic separator arrangement 20.

Figure 14:
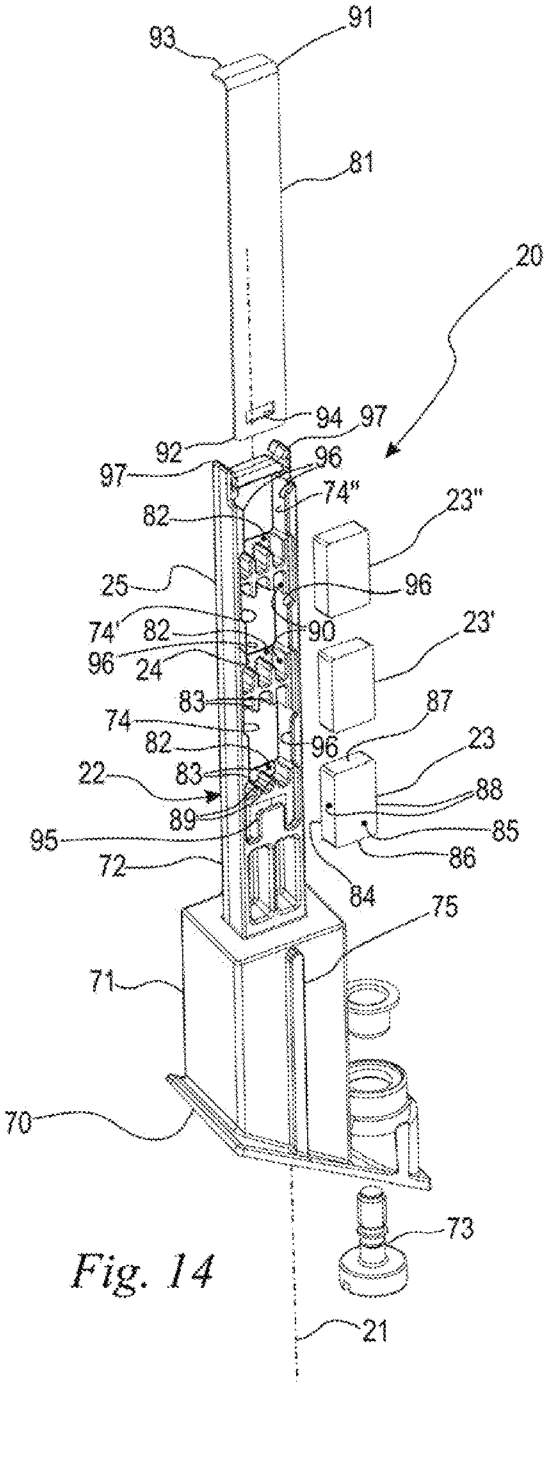
FIG. 14 shows, in a perspective exploded illustration, the magnetic separator arrangement according to FIG. 13.

As shown in FIG. 14, the permanent magnet 23, 23', 23" is held at its two end faces 86, 87 by positioning webs 83 in the direction of the longitudinal axis 21 of the magnetic separator arrangement 20. In the preferred embodiment, at least two positioning webs 83 spaced apart from one another are provided on the carrier 22 for the first end face 86 of the permanent magnet 23, 23', 23". The positioning webs 83 each have an active surface 89 with which they make contact with the first end face 86 of the permanent magnet 23, 23', 23". Also for the second end face 87 of the permanent magnet 23, 23', 23", at least two positioning webs 83 are provided, which make contact by their active surfaces 89 with the second end face 87 of the permanent magnet 23, 23', 23". A two-point support is thus provided on both end faces 86, 87 of the permanent magnet 23, 23', 23", the two-point support permitting a good fixation of the permanent magnet 23, 23', 23" in the carrier 22 in the direction of the longitudinal axis 21. Clearances are provided between the individual positioning webs 83. The clearances allow dirt particles to be picked up and/or removed so that they do not become trapped between carrier 22 and permanent magnet 23, 23', 23" when the permanent magnets 22, 23', 23" are attached. Simple and safe mounting of the permanent magnets 23, 23', 23" is thus possible even in a dirty environment. In addition, material accumulations are avoided by the formation of the positioning webs 83. The carrier 22 is preferably cast, in particular injection molded. By avoiding corresponding material accumulations via the formation of positioning webs 83, warping during production of the components can be avoided. In addition, the positioning webs 83 are also used to compensate for tolerances. If the permanent magnet 23, 23', 23" has to be pressed in between the positioning webs 83 under pressure, the positioning webs 83 can be deformed better in comparison to material accumulations.

As shown in FIG. 14, the permanent magnet 23, 23', 23" is fixed on its respective longitudinal side 88 via two side supports 90 spaced apart from each other. A clearance is also formed between the side supports 90, and therefore between the side supports 90 the permanent magnet 23, 23', 23" is not contacted by the carrier 22. For the same reasons described above, simple and safe mounting of the permanent magnets 23, 23', 23" can thus be achieved even in a dirty environment.

As shown in FIG. 14, the fixation element 81 is tongue-shaped. The fixation element 81 can be plugged onto the carrier 22 of the magnetic separator arrangement 20. If the fixation element 81 is plugged onto the carrier 22, the fixation element covers the permanent magnets 23, 23', 23" at least partially, in particular completely on the first longitudinal side 24 of the magnetic separator arrangement 20. The fixation element 81 is fastened releasably to the carrier 22. In the preferred embodiment, the fixation element 81 is held on the carrier 22 by a latching connection. The latching connection can be undone by the operator such that the fixation element 81 can be released again from the carrier. Alternatively, other connections for fastening the fixation element 81 on the carrier 22 of the magnetic separator arrangement 20 may also be expedient.

As shown in FIG. 14, the fixation element 81 extends from a first end 91 as far as a second end 92. At the first end 91, the fixation element 81 is offset, the offset being formed by a type of tab 93. At the second end 92, the fixation element 81 has an opening 94, which is provided for receiving a latching hook 95. The latching hook 95 is formed on the carrier 22.

Figure 15:
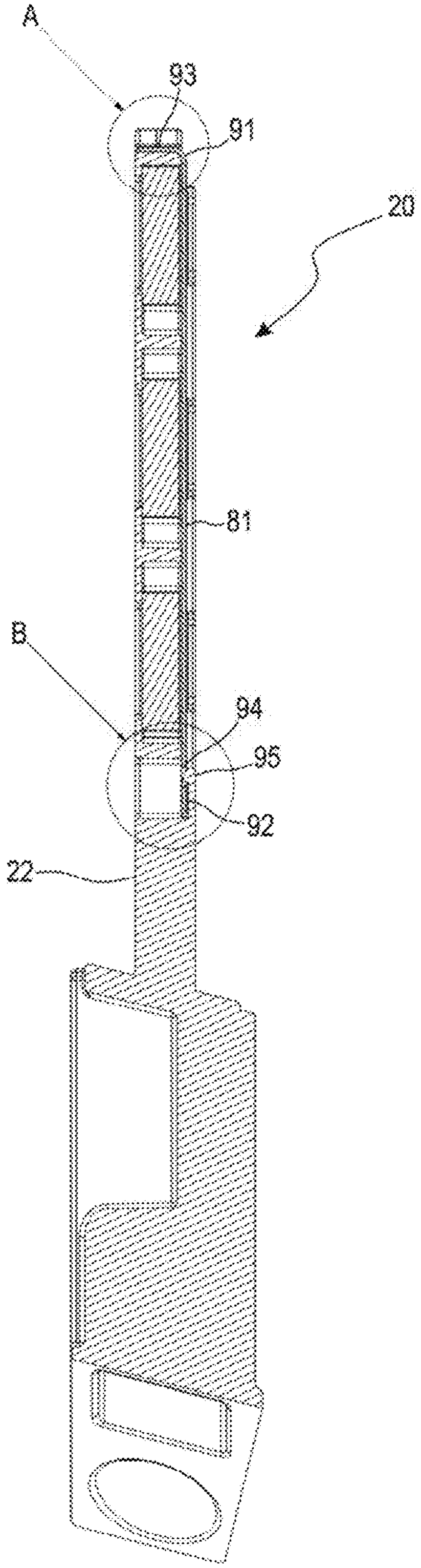
FIG. 15 shows, in a sectional illustration, the magnetic separator arrangement according to FIG. 13.
Figure 16:
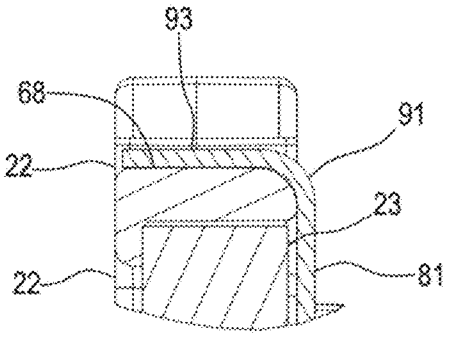
FIG. 16 shows, in a sectional illustration of the detail A according to FIG. 15, the upper end of the fixation element of the magnetic separator arrangement according to FIG. 13; and, FIG. 17 shows, in a sectional illustration of the detail B according to FIG. 15, the lower end of the fixation element of the magnetic separator arrangement according to FIG. 13.
Figure 17:
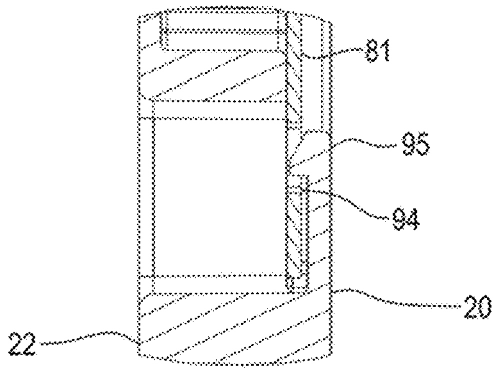

For fastening the permanent magnets 23, 23', 23" in the carrier 22, the permanent magnets 23, 23', 23" are to be inserted or pushed into the openings provided for this purpose 74, 74', 74" until they butt with their bottom side 84 against the supporting surface 82 of the carrier 22. The fixation element 81 with its second end 92 in front is then to be pushed into the carrier 22 in the direction of the longitudinal axis 21. For this purpose, a guide is formed on the first longitudinal side 24 of the carrier 22 or the magnetic separator arrangement 20, in which the fixation element 81 slides into the carrier 22. The guide is formed by a plurality of tabs 96 which are arranged laterally on the carrier 22 and engage over the fixation element 81. The fixation element 81 is held between the side tabs 96 and the positioning webs 83 when it is pushed into the carrier 22. As shown in FIGS. 15 to 17, the fixation element 81 is to be pushed into the carrier 22 until the tab 93 at the first end 91 of the fixation element 81 comes to bear against a stop 68 of the carrier 22. In addition, the latching hook 95 of the carrier 22 latches in the opening 94 of the fixation element 81 and fixes the latter in the carrier 22. The latching can be released again by lifting the latching hook 95 in order to pull the fixation element 81 out of the carrier 22 again. Furthermore, two further latching hooks 97 are formed on the carrier 22, the latching hooks engaging around the tab 93 and additionally holding the fixation element 81 in the guide (FIGS. 13 and 14).

In an embodiment, the fixation device 81 is made from a non-ferromagnetic material in order not to weaken or undo the magnetic effect of the permanent magnets 23, 23', 23" by shielding or magnetic flux linkage. The fixation device 81 may be in the form of a metal sheet. The fixation device 81 may also be composed of a plastic.

It is understood that the foregoing description is that of the preferred embodiments of the invention and that various changes and modifications may be made thereto without departing from the spirit and scope of the invention as defined in the appended claims.

The invention claimed is:

1. An electrical work apparatus comprising:
a housing;
a drive motor arranged in said housing;
said drive motor being an electric motor and being configured to drive a tool of the work apparatus;
a cooling air channel formed in said housing for guiding a cooling air flow for cooling said drive motor;
said cooling air channel having a curved channel section;
a magnetic separator arrangement arranged in said cooling air channel for separating ferromagnetic particles from said cooling air flow; and,
said magnetic separator arrangement being arranged in said curved channel section of said cooling air channel upstream of said drive motor with respect to said cooling air flow.

2. The electrical work apparatus of claim 1, wherein said cooling air flow in said curved channel section has a main flow; said main flow runs substantially perpendicularly to a first flow plane and perpendicularly to a second flow plane; said first flow plane and said second flow plane enclose an angle (α); and, said angle (α) is at least 10°.

3. The electric handheld work apparatus of claim 2, wherein said angle (α) is at least one of at least 30°, at least 60°, and at least 80°.

4. The electric handheld work apparatus of claim 2, wherein said magnetic separator arrangement extends between said first flow plane and said second flow plane over an angle (β) which is at least 10°.

5. The electric handheld work apparatus of claim 4, wherein said angle (β) is at least one of at least 30° and at least 50°.

6. The electrical work apparatus of claim 2, wherein said magnetic separator arrangement overlaps with said main flow in a direction of said main flow in said first flow plane.

7. The electric work apparatus of claim 6, wherein said magnetic separator arrangement overlaps with said main flow counter to a direction of said main flow in said second flow plane.

8. The electrical work apparatus of claim 2, wherein said magnetic separator arrangement extends along a longitudinal axis and, with respect to said longitudinal axis, is arranged tangentially to said main flow.

9. The electrical work apparatus of claim 1, wherein said curved channel section defines a channel interior space; said curved channel section has an inner side and an outer side in said channel interior space in a region of said curve; and, a distance between said magnetic separator arrangement and said outer side is smaller than a distance between said magnetic separator arrangement and said inner side.

10. The electrical work apparatus of claim 1, wherein said magnetic separator arrangement is held releasably on said housing.

11. The electrical work apparatus of claim 1, wherein said magnetic separator arrangement includes a carrier and at least one permanent magnet held at least one of in and on said carrier.

12. The electrical work apparatus of claim 11, wherein said curved channel section has a first longitudinal side and a second longitudinal side opposite said first longitudinal side; said magnetic separator arrangement is arranged in said curved channel section such that said flow can pass around said magnetic separator arrangement in a region of said at least one permanent magnet both on a first side of said magnetic separator arrangement facing said first longitudinal side of said curved channel section and on a second side of said magnetic separator arrangement facing said second longitudinal side of said curved channel section.

13. The electrical work apparatus of claim 11, wherein said magnetic separator arrangement includes a plurality of permanent magnets which are arranged one behind another in a direction of said longitudinal axis of said magnetic separator arrangement.

14. The electrical work apparatus of claim 11, wherein said magnetic separator arrangement includes at least three permanent magnets arranged one behind another in a direction of said longitudinal axis of said magnetic separator arrangement.

15. The electrical work apparatus of claim 1, wherein said housing includes a ventilation grid with at least one inlet opening for said cooling air flow; and, said inlet opening is part of said cooling air channel and leads into said curved channel section.

16. The electrical work apparatus of claim 15, wherein said at least one inlet opening forms a drainage opening of said cooling air channel.

17. The electrical work apparatus of claim 15, wherein a reservoir for collecting dirt particles is provided in a region of said at least one inlet opening in said cooling air channel.

* * * * *